Patented Aug. 24, 1954

2,687,442

UNITED STATES PATENT OFFICE 2,687,442

POLYMERIZATION INHIBITORS

George C. Claver, Jr., South Hadley, Mass., assignor to Monsanto Chemical Company, St. Louis, Mo., a corporation of Delaware No Drawing. Application March 28, 1951,
Serial No. 218,085

8 Claims. (Cl. 260—666.5)

This invention relates to monomeric aromatic compounds containing ethylenic unsaturation in a side chain which are inhibited against polymerization. More particularly the invention relates to amine oxides as polymerization inhibitors for styrene. Aromatic compounds containing ethylenic unsaturation in the side chain such as styrene cannot be stored or shipped without risking autopolymerization which can become dangerous due to the exothermic nature of the polymerization reaction.

One object of this invention is to provide new polymerization inhibitors of aromatic compounds containing ethylenic unsaturation in a side chain. A further object is to provide inhibited monomeric aromatic compounds containing ethylenic unsaturation in a side chain.

These and other objects are attained by adding an inhibiting amount of an amine oxide to the monomeric compounds.

The following example is given in illustration and is not intended as limitations on the scope of this invention. Where parts are mentioned, they are parts by weight.

Example

Diethyl ethanol amine oxide was dissolved in substantially pure monomeric styrene. About 0.1 part of the amine oxide was used for 100 parts of monomer. The styrene was then heated at 120° C. for 6–8 days. Substantially no polymerization of the styrene occurred during this time. When some of the same styrene without the amine oxide was heated at 90° C. it began to polymerize after several hours and was a solid polymer in two days.

Substantially the same results are observed when the diethyl ethanol amine oxide is replaced by equal amounts of triethyl amine oxide. Styrene monomer containing 0.01 part of diethyl ethanol amine oxide and triethyl amine oxide does not polymerize at 90° C. even when held at this temperature for several weeks.

The stabilizers of this invention are oxides of tertiary amines in which the substituents on the nitrogen atom may be alkyl, alkylol, aralkyl, aryl, cyclic or a combination of two or more of these groups. They are derived from tertiary amines and a peroxide, preferably hydrogen peroxide. The amine oxides are stable compounds and appear to have specific action on aromatic compounds having ethylenic unsaturation in a side chain. Examples of the different types of amine oxides which are operative are trialkyl amine oxides such as trimethyl, triethyl, tributyl, trioctyl, etc. amine oxides, trialkylol amine oxides such as triethanolamine oxide, mixed alkyl alkylol amine oxides such as diethyl ethanol amine oxide, triaryl amine oxides such as triphenyl amine oxide, mixed alkyl aryl amine oxides such as dimethyl aniline oxide, triaralkyl amine oxides such as tribenzyl amine oxide and heterocyclic amine oxides such as pyridine oxide, quinoline oxide, etc.

The inhibiting action of the amine oxides on the monomeric aromatic compounds containing ethylenic unsaturation in the side chain is completely unexpected in view of U. S. Patent 2,398,926. In this patent it is disclosed that these same amine oxides are catalysts which accelerate the polymerization and copolymerization of ethylene. The action of the amine oxides is diametrically opposite for the two classes of ethylenically unsaturated compounds.

The amine oxides are effective as polymerization inhibitors for aromatic compounds containing ethylenic unsaturation in a side chain in concentrations as low as five parts per million parts of monomer. At 5 p. p. m., the monomers may be polymerized by adding an excess of catalyst. When larger quantities are used, it is desirable to remove the inhibitors before attempting to polymerize the monomer. This may be accomplished simply, quickly and quantitatively by scrubbing the monomer with water. Since the amine oxides are soluble in water, the separation of the inhibitor from the monomer is complete and rapid.

The amine oxides may be used to inhibit polymerization of monomeric aromatic compounds containing ethylenic unsaturation in the side chain. Of prime importance are the monomers of styrene, alpha methyl styrene, ring methylated styrenes and ring chlorinated styrenes.

It is obvious that variations may be made in the products and processes of this invention without departing from the spirit and scope thereof as defined by the appended claims.

What is claimed is:

1. Monomeric styrene containing a polymerization inhibiting amount of an amine oxide, said amine oxide inhibiting the polymerization of the styrene at temperatures up to 120° C.

2. Monomeric styrene containing a polymerization inhibiting amount of diethyl ethanol amine oxide, said amine oxide inhibiting the polymerization of the styrene at temperatures up to 120° C.

3. Monomeric styrene containing a polymerization inhibiting amount of triethyl amine oxide, said amine oxide inhibiting the polymerization of the styrene at temperatures up to 120° C.

4. A monomeric aromatic hydrocarbon compound containing ethylenic unsaturation in a side chain said compound being one of the group consisting of styrene, alpha methyl styrene, ring methylated styrenes and ring chlorinated styrenes, said compound containing in admixture therewith a polymerization inhibiting amount of an amine oxide, said amine oxide inhibiting polymerization of the compound at temperatures up to 120° C.

5. A process for inhibiting the polymerization of aromatic hydrocarbon compounds taken from the group consisting of styrene, alpha methyl styrene, ring methylated styrenes and ring chlorinated styrenes, which comprises mixing therewith an inhibiting amount of an amine oxide, said inhibiting effect being operative at temperatures up to 120° C.

6. A process as in claim 5 wherein the compound is styrene.

7. A process as in claim 5 wherein the amine oxide is diethyl ethanol amine oxide.

8. A process as in claim 5 wherein the amine oxide is triethyl amine oxide.

References Cited in the file of this patent

UNITED STATES PATENTS

| Number | Name | Date |
|---|---|---|
| 2,398,926 | Dorough | Apr. 23, 1946 |
| 2,413,255 | Soday | Dec. 24, 1946 |

OTHER REFERENCES

Egloff, Physical Constants of Hydrocarbons, vol. III, pages 244 and 254 (2 pages). Reinhold Pub. Corp., New York (1946).